July 6, 1954
P. E. BESSIERE
2,683,229
ELECTRODYNAMIC BRAKE
Filed Oct. 5, 1951
2 Sheets-Sheet 1
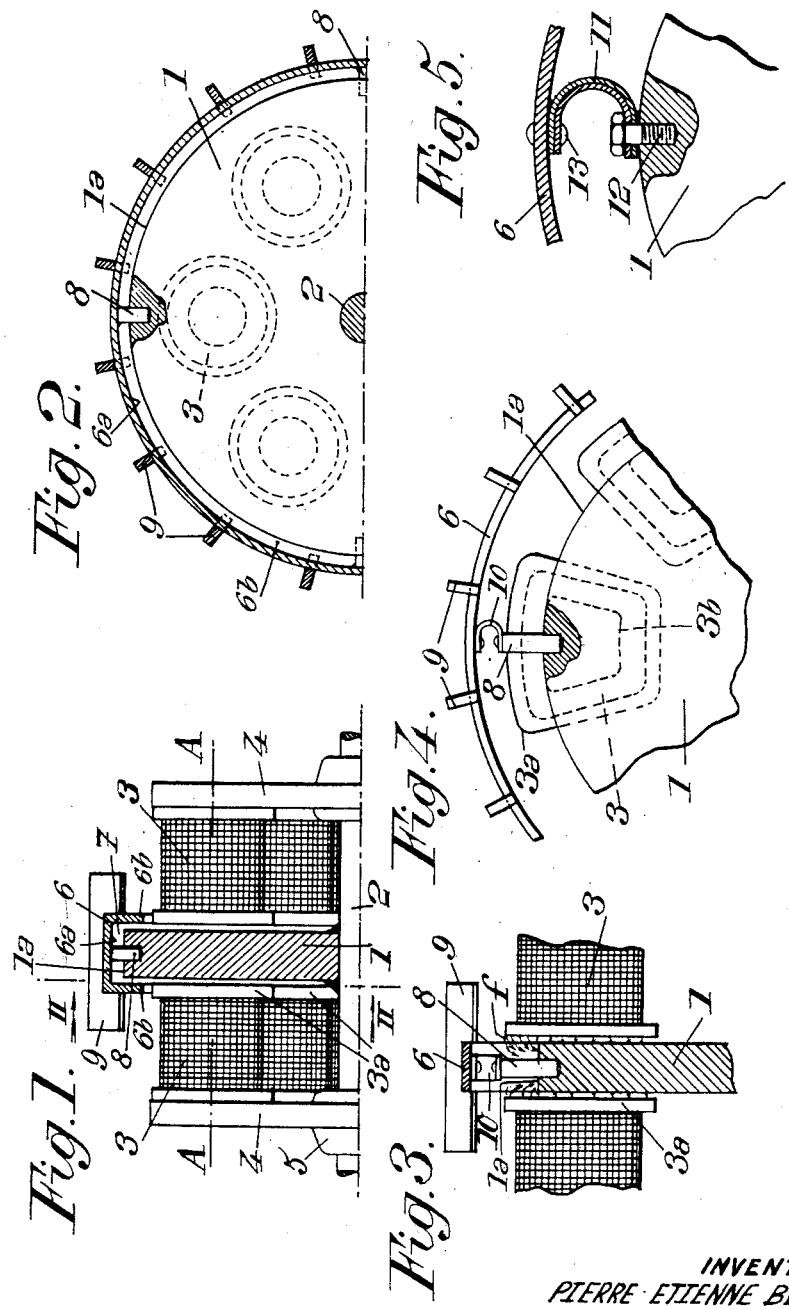
INVENTOR
PIERRE ETIENNE BESSIERE
BY
ATTORNEYS July 6, 1954  P. E. BESSIERE  2,683,229
ELECTRODYNAMIC BRAKE
Filed Oct. 5, 1951  2 Sheets-Sheet 2

INVENTOR
PIERRE ETIENNE BESSIERE
BY
ATTORNEYS

Patented July 6, 1954

2,683,229

UNITED STATES PATENT OFFICE 2,683,229

ELECTRODYNAMIC BRAKE

Pierre Etienne Bessière, Paris, France, assignor to Society "Electro-Mecanique de l'Aveyron," S. A., Rodez (Aveyron), France, a society of France Application October 5, 1951, Serial No. 249,925

Claims priority, application France October 13, 1950

9 Claims. (Cl. 310—93)

The present invention relates to electro-dynamic brakes, that is to say to brakes essentially constituted, on the one hand by a disc-shaped armature of a magnetic material turning together with the shaft to be braked (this armature will be hereinafter called rotor) and on the other hand by an inductor including pole pieces forming two sets disposed on either side of the armature, the inductor, when it is energized by an electric current, producing Foucault currents in the rotor which will thus be subjected to a braking action and also heated, the heat thus generated being taken off from the rotor through suitable cooling means.

The object of my invention is to provide brakes of this kind which are better adapted to meet the requirements of practice than those used up to now and such in particular that the internal strains produced therein by an unequal heating of the rotor and which might cause warping thereof are reduced.

My invention consists chiefly in surrounding the edge of the rotor with means capable of reducing the dissipation of heat from this rotor into the surrounding air so as thus to reduce and possibly to eliminate differences of temperature between the edge of the rotor and the more central portions thereof.

Preferably, these means are constituted by a ring concentric with the rotor and of a diameter such that an interval is left between the peripheral cylindrical surface of the rotor and the inner cylindrical surface of the ring, this ring being fixed to the rotor through a small number of connecting elements of small section which practically do not interfere with the thermal insulation achieved by this interval between the ring and the rotor.

Preferred embodiments of my invention will be hereinafter described with reference to the accompanying drawings, given merely by way of example, and in which:

Figs. 1 and 2 diagrammatically show, respectively in axial section and in section on the line II—II of Fig. 1, one half of a brake made according to my invention.

Figs. 3 and 4 similarly show one half of brake made according to another embodiment of my invention.

Figure 6:
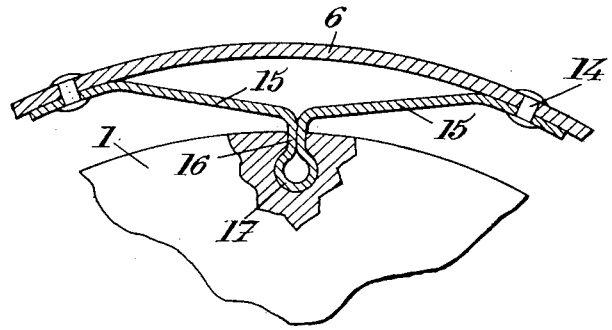
Figure 7:
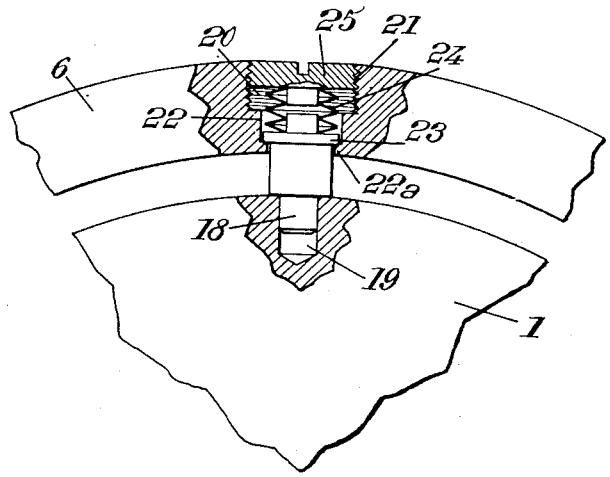

Figs. 5, 6 and 7 show detail modifications of brakes such as shown by Figs. 1 to 4.

The brake includes a magnetic metal disc-shaped rotor 1 rigid with the shaft 2 to be braked. The rotor revolves together with the shaft between two sets of pole pieces 3 fixed in a frame 4 which is also preferably made of a magnetic metal and which also supports the bearings 5 of shaft 2. Frame 4 and the pole pieces are fixed to the base of the apparatus to which shaft 2 belongs, that is to say, in the case of a vehicle, to the chassis thereof.

When pole pieces 3 are energized by an electric current, a magnetic flux is created which produces in rotor 1 Foucault or analogous currents which, closing through the rotor, both brake it and heat it.

The heat thus produced is taken off from the rotor by an air stream which is obtained by the rotation of this rotor itself. As a matter of fact, this rotor, in the course of its rotation, acts in fan-like fashion upon the air which surrounds it, thus drawing in air near the axis of rotation of the rotor and discharging this air radially into the surrounding atmosphere.

In the known brakes of this kind, it was found that the rotors undergo a very unequal heating which may result, after a time, into a detrimental warping thereof. This is due to the fact that the peripheral cylindrical surface of the rotor freely gives off its heat into the surrounding air and is thus subjected to a more intensive cooling than the portions of the rotor located closer to the center thereof, and in particular the portions of the rotor located opposite axis A—A, where the magnetic induction is particularly intensive. Unequality between the temperatures of the peripheral edge of the rotor and those of the more central portions thereof, especially those located opposite axis A—A, is further increased when the edge of the rotor is fitted with fan blades which serve to intensify the fan action of the rotor and which, due to the large areas over which they are in contact with the surrounding air, also produce an intensive cooling by conduction of heat from the peripheral portion of the rotor. The unequal temperatures in the rotor produce, in known brakes, expansions which are also unequal and, consequently, important strains in the mass thereof.

In order to reduce these unequalities, and possibly to eliminate them, according to the main feature of the invention, I surround the periphery of the disc which forms the rotor with means capable of reducing the dissipation into the surrounding air of the heat developed in this edge, so as thus to reduce and possibly to eliminate the differences of temperature between the edge of the rotor and the portions thereof located closer to its center.

Preferably, these means are constituted by a ring 6 concentric with the rotor and the diameter of which is such that an air interval 7 exists between the peripheral cylindrical surface 1a of the rotor and the inner cylindrical surface 6a of ring 6. Furthermore, this ring is fixed to the rotor through a small number of interconnecting elements 8, for instance two, three or four interconnecting elements, having but a very small section with respect to the peripheral cylindrical surface of the rotor, whereby these interconnecting elements substantially do not interfere with the thermal insulation existing between the outer ring 6 and rotor 1 and, consequently, with the protection afforded by ring 6 to rotor 1 against dissipation into the surrounding air of the heat present in the peripheral edge of rotor 1.

When the edge of rotor 1 extends radially beyond the points of the flanged ends 3a of pole pieces 3 which are farthest from the axis of shaft 2, as shown by Figs. 1 and 2, it may be useful to complete the protecting action of rings 6 by the provision of annular side flanges 6b, integral with ring 6 and which give thereto a U-shaped section surrounding the edge of rotor 1. Of course, a clearance is also provided between the side faces of rotor 1 and the inner faces of flanges 6b.

In order to avoid short-circuiting of the lines of force by ring 6, it may be useful to make it of a non-magnetic metal.

According to an advantageous embodiment, I fix on ring 6 thermally insulated from the edge of rotor 1, fan blades 9 which intensify the cooling air streams obtained by the rotation of rotor 1, without having the drawbacks of the known blades, that is to say without cooling the edge of rotor 1.

Concerning the interconnecting means 8, they may be constituted by mere stud-bolts. However, it seems particularly advantageous to provide these means with elastically deformable elements which, by deformation, allow for unequal expansions of the relatively hot peripheral edge of rotor 1 and the relatively cold ring 6 respectively, without detrimental stresses being created in the rotor or in the ring. For instance, the interconnecting elements may be constituted by U-shaped spring leaves 10 (see Fig. 4) interposed between ring 6 and every stud 8.

According to another construction made for the same purpose (see Fig. 5), the interconnecting elements may be constituted by bi-metallic strips 11 obtained by associating two metals having different coefficients of expansion and forming an arc which closes when the temperature rises. Every bi-metallic strip is fixed respectively upon the periphery of the rotor and the inner wall of the ring, by means of screws 12 and rivets or screws 13.

According to another embodiment of the invention, the interconnecting means are constituted by one or several elastic strips extending between the ring and the disc. According to the construction of Fig. 6, two elastic strips are combined to form a single band the ends of which are fixed, for instance by means of rivets 14, to ring 6 whereas the middle part of the band is fixed to disc 1. For instance, this band has the form shown by Fig. 6, i. e. it is constituted by two side arms 15 forming together a V having a large apex angle and applied against each other at 16, the middle part of the band forming a loop 17 inserted in a corresponding slot of disc 1. The free ends of arms 15 are riveted to ring 6. The band above described has an elasticity sufficient to be slightly and elastically crushed under the thrust of the disc when the edge thereof moves as a result of its being heated. Of course, the middle of the band might be secured to the disc through other means, such as a finger engaging into a hole provided in the periphery of the disc.

Finally, still another way of fixing the ring to the disc is shown by Fig. 7. According to this modification, I provide, on the periphery of disc 1, several, for instance two or three, driving fingers 18 inserted in holes 19 provided in the edge of the disc. Ring 6 is provided with holes 20 in the outer portion of each of which screw threads 21 are provided, whereas the inner portion of each hole is intended radially to guide the head 23 of the corresponding finger 18, this head bearing normally against a shoulder 22a provided at the inner end of hole 20. Finally a spring constituted for instance by several elastic washers 24 is interposed between said head 23 and a nut 25 screwed in screw threaded portion 31.

The ring is fully centered with respect to rotor 1 by the cooperation of a plurality of fingers 18 with corresponding fingers 26 of the ring, these fingers further ensuring the drive of the ring by the rotor when said rotor is rotating. However, the rotor can expand freely by compressing washers 24.

In the brake construction according to my invention shown by Figs. 3 and 4, rotor 1 is of a diameter smaller than the diameter of the circle circumscribed to the flanged ends 3a of pole pieces 3. I thus obtain, in addition to the thermal insulation effect with respect to the surrounding air which is due to the provision of ring 6, advantageously provided with blades or fins 9, a heating action exerted on the edge of rotor 1 by the lines of force f which enter the rotor through its peripheral cylindrical surface 1a (see Figs. 3 and 4). In this construction, the flanged ends 3a and the cores 3b of the pole pieces are advantageously given a triangular or trapezoidal shape in order to increase the mean induction at the periphery of the rotor.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electro-dynamic brake for slowing down a rotating part which comprises, in combination, a frame, a disc-shaped rotor made of a magnetic material rotatable in said frame and adapted to be mounted on said part for rotating therewith, pole pieces carried in fixed angular position by said frame, laterally with respect to said rotor to produce Foucault currents in said rotor when said pole pieces are energized by an electric current and the rotor turns with respect thereto, a ring coaxially surrounding said rotor and of a diameter such as to leave an air interval between the peripheral cylindrical surface of said rotor and the inner cylindrical surface of said ring to ensure thermal insulation between said rotor and said ring and a limited number of interconnecting elements between said rotor and said ring to hold said ring in coaxial relation to said rotor.

2. A brake according to claim 1, in which said ring is of U-shaped section, including side flanges covering laterally the edge of said rotor.

3. A brake according to claim 1 in which the ring is made of a non-magnetic metal.

4. A brake according to claim 1 further including externally extending fan blades carried by said ring.

5. A brake according to claim 1 in which said interconnecting elements are elastic in order to make allowance for the unequal expansions of the rotor and the ring.

6. A brake according to claim 1 in which said interconnecting elements include U-shaped springs.

7. A brake according to claim 1 in which said interconnecting elements are constituted by V-shaped elastic strips fixed at their apex to one of the two elements to be interconnected and at their free ends to the other element.

8. A brake according to claim 1 in which the interconnecting elements include U-shaped bi-metallic strips arranged so that the arc they form closes when the temperature increases.

9. A brake according to claim 1 in which radial holes are provided in the edge of the rotor and corresponding holes are provided in the ring, these last mentioned holes being provided at their inner end with a shoulder, and being screw threaded at their outer end, said interconnecting means consisting of fingers having their inner ends engaged in the first mentioned holes and their outer ends flanged to bear against said shoulders, nuts screwed in said screw threaded portions of the second mentioned holes, and elastic washers each interposed between the flanged end of each finger and the corresponding nut.

References Cited in the file of this patent

UNITED STATES PATENTS

| Number | Name | Date |
| --- | --- | --- |
| 1,516,254 | Towar | Nov. 18, 1924 |
| 2,068,820 | Sarazin | Jan. 26, 1937 |
| 2,158,337 | Rasmussen | May 16, 1939 |

FOREIGN PATENTS

| Number | Country | Date |
| --- | --- | --- |
| 629,919 | Great Britain | Sept. 30, 1949 |
| 630,806 | Great Britain | Oct. 21, 1949 |
| 661,027 | Germany | June 9, 1938 |